United States Patent [19]

Dye

[11] Patent Number: 5,309,522
[45] Date of Patent: May 3, 1994

[54] STEREOSCOPIC DETERMINATION OF TERRAIN ELEVATION
[75] Inventor: Robert Dye, Ann Arbor, Mich.
[73] Assignee: Environmental Research Institute of Michigan, Ann Arbor, Mich.
[21] Appl. No.: 906,554
[22] Filed: Jun. 30, 1992
[51] Int. Cl.$^5$ .................. G01C 3/20; G01C 11/12; G06K 9/36; G06K 9/54
[52] U.S. Cl. ............................. 382/41; 356/2; 356/12; 382/49; 348/42
[58] Field of Search ............... 382/39, 41, 49; 356/2, 356/12; 358/88, 133

[56] References Cited
U.S. PATENT DOCUMENTS

| | | | |
|---|---|---|---|
| 4,539,701 | 9/1985 | Galbreath et al. | 356/2 |
| 5,063,603 | 11/1991 | Burt | 382/39 |
| 5,122,873 | 6/1992 | Golin | 382/49 |
| 5,179,441 | 1/1993 | Anderson et al. | 358/88 |
| 5,187,754 | 2/1993 | Currin et al. | 382/49 |
| 5,220,441 | 6/1993 | Gerstenberger | 356/2 |

OTHER PUBLICATIONS

"Hierarchical Multipoint Matching", Photogrammetric Engineering & Remote Sensing, vol. 57, No. 8, Aug. 1991, pp. 1039-1047, by Mengxiang Li.
"An Operator-Based Matching System", Photogrammetric Engineering & Remote Sensing, vol. 57, No. 8, Aug. 1991, pp. 1049-1055, by Joshua S. Greenfield.
"Towards an Autonomous System for Orienting Digital Stereopairs", Photogrammetric Engineering & Remote Sensing, vol. 57, No. 8, Aug. 1991, pp. 1057-1064, by Toni Schenk, Jin-Cheng Li and Charles Toth.

Primary Examiner—Leo H. Boudreau
Assistant Examiner—John B. Vigushin
Attorney, Agent, or Firm—Krass & Young

[57] ABSTRACT

Digitized stereo image pairs are analyzed by first aggregating the images to produce several levels of lower resolution images, bandpass filtering each of the images by applying a Laplacian filter to edge enhance the features, matching the features of low resolution images while generating a disparity image which contains elevation information, repeating the feature matching at successively higher resolutions and creating progressively improving disparity images, and extracting the elevation data from the final disparity image. The feature matching procedure uses an estimate of feature disparity to help locate a feature in one image which corresponds to a feature in another image and is applied iteratively at each level of resolution. Dilation of disparity data from matched points to neighboring unmatched areas produces a comprehensive disparity image which aids in more efficient feature location on the next pass.

7 Claims, 3 Drawing Sheets

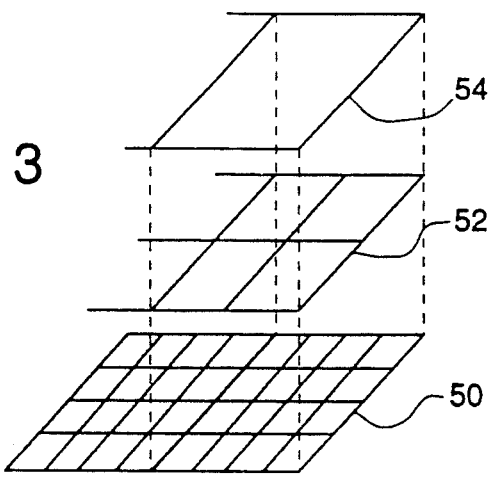
FIG - 3
FIG - 4
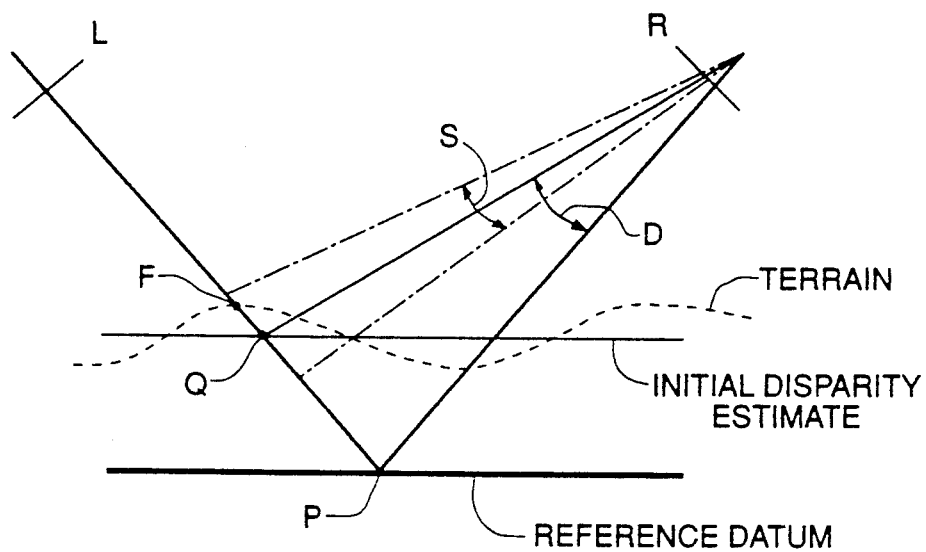
FIG - 5
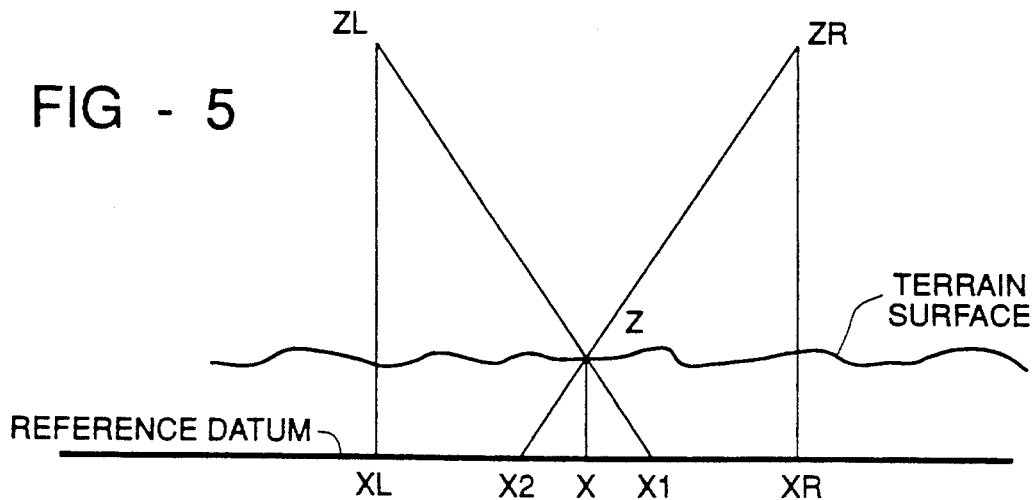

STEREOSCOPIC DETERMINATION OF TERRAIN ELEVATION

FIELD OF THE INVENTION

This invention relates to a method of determining elevation from a pair of stereo images and particularly to an automatic process for matching features on an image pair and extracting feature elevation.

BACKGROUND OF THE INVENTION

In the mapping community there is a growing need for accurate digital elevation data. Such data are frequently used to calculate slope, aspect, and intervisibility. In the area of remote sensing, digital elevation data may be used to generate perspective views for flight simulators, 3-D mapping, or for orthorectification of digital satellite data. Orthorectification is a process of removing the horizontal displacement, and thus knowledge of the elevation is important in accurate determination of correct features location.

It is well known to prepare maps from stereo images obtained from satellite or aircraft overflights. Features in the images are horizontally displaced due to viewing geometry and terrain relief. The displacement due to relief is a function of the look angle and the elevation. Heretofore, the extraction of elevation data from stereo images involved optical techniques requiring intensive human effort or computer operations assisted by human interaction. Some techniques involve correlation and regression. One of the major drawbacks to the correlation approach is the intensive computer processing that must be done.

A feature matching approach is much less computer-intensive. An additional advantage is that it is thought to best imitate the human vision system. Since human vision has the ability to quickly judge distances, it serves as a good model for a machine-based approach. It is postulated in Marr, D., 1982, *Vision, A Computational Investigation into the Human Representation and Processing of Visual Information,* W. H. Freeman and Co., San Francisco, that human vision rapidly identifies features in a scene by applying a large bandpass filter to the image to form a general impression followed by a series of successively smaller filters for more detail. Computer simulation of vision is described, and Marr suggests that the ideal filter is Laplacian, although the simulation used a nested series of filters which approximates Laplacian filters. The simulation used feature extraction by identifying zero crossings in the filtered images.

SUMMARY OF THE INVENTION

A feature matching method of identifying corresponding features in stereo images is carried out in several steps and relief data for the features is progressively developed at the same time. The images are reduced in resolution by aggregation to produce several levels of lower resolution images, and the images at each resolution level are filtered by the same size band pass filter for edge enhancement. Preferably, the filter is a Laplacian filter but other bandpass filters may be used. A simplistic relief image is first derived in conjunction with feature matching on the lowest resolution edge enhanced image pair, and that image is used to assist in feature matching of the next higher resolution image pair to obtain a better relief image, and so on until the process is applied to the highest resolution filtered images. In the event that only a low number of matches are obtained on a particular level of resolution, the feature matching may be repeated using the relief image from the previous operation as a guide in helping to locate matching features. The final relief image embodies the elevation information and is used for the extraction of elevation information in the desired form.

The stereo images are processed by computer operations only, requiring no human decisions to determine the matching features or the elevation of any point, and is subject to fully automated processing. Moreover, a relatively low intensity of computer processing is required.

BRIEF DESCRIPTION OF THE DRAWINGS

The above and other advantages of the invention will become more apparent from the following description taken in conjunction with the accompanying drawings wherein like references refer to like parts and wherein:

FIG. 3 is a diagram of image pixels illustrating the principle of aggregation;

FIG. 4 is a diagram illustrating the disparity of a point in stereo images and the search procedure for matching features; and FIG. 5 is a diagram illustrating the geometry of elevation extraction.

DESCRIPTION OF THE INVENTION

Two stereo images of terrain to be mapped are used as the beginning of the elevation extraction method. The images may be obtained from any suitable source. For example, the French SPOT satellite system has side-looking capability to view a scene at a given angle during one pass and from another perspective during another pass over the same region, thus obtaining two digitized images of the same terrain from a nominal height of 830 kilometers.

The accuracy of the elevation estimate depends upon two things. First, the accuracy of the geometric correction for each image will ultimately determine the geographic framework of the extracted elevation. Second, the base-to-height ratio of the two images will determine how much a feature will be displaced for a given amount of relief. Two views with similar look angles, therefore, will not exhibit any displacement between the two images. A wider photo base will allow the displacement to be large enough to measure accurately. A useful base-to-height ratio is between 0.5 and 1. The satellite base length is the distance between the nadir traces of the satellite passes.

Geometric correction is performed by methods well known in the art to generate mapping polynomials for each image in the stereo pair to remove sensor and platform motion, relative rotation between images, earth curvature and non-linear distortion due to off-nadir viewing. These mapping polynomials are subsequently used during the elevation extraction process to navigate within each image. This description includes the usage of the polynomials for such steering. However, in a case where the stereo images have already been geometrically corrected, the mapping polynomials would no longer be required in the elevation extraction process.

Since each satellite image may cover an area greater than that corresponding to the map being made, the digitized images are reduced by carving out the area of interest. Then the data is ready for automatic extraction of elevation information. When photographic images are used rather than digitized images, a stereo pair is similarly prepared to assure that each image covers just the area of interest.

Figure 1:
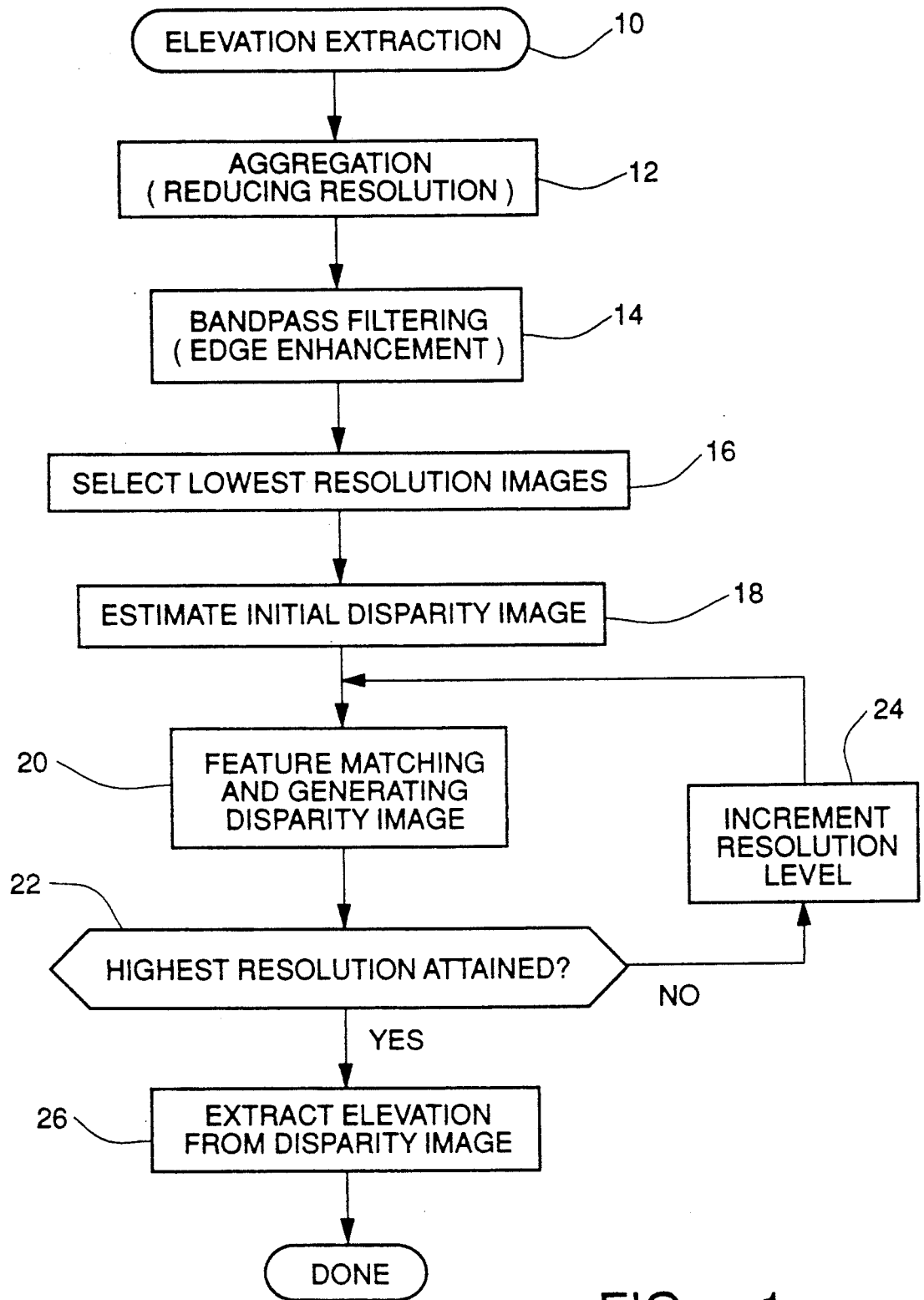
FIGS. 1 and 2 are flow charts illustrating the method of extracting elevation according to the invention.
Figure 2:
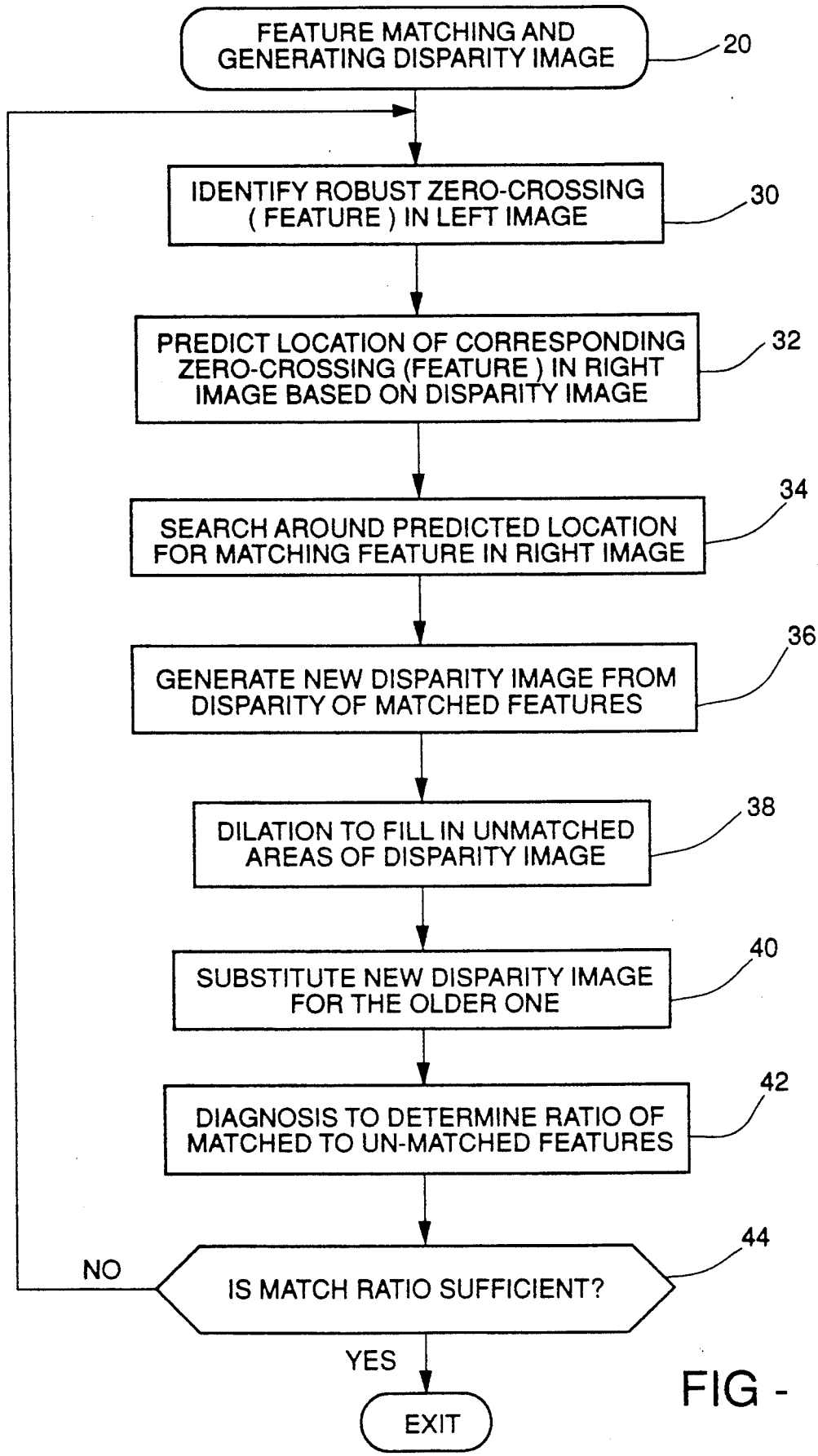

The flow charts of FIGS. 1 and 2 provide an overview of the elevation extraction method. Numerals in angle brackets, <nn>, refer to functions identified in the boxes bearing the same reference numerals. In this overview it is assumed that the images are geometrically corrected and that elevation accounts for all of the differences in the images. As set forth in the flow chart of FIG. 1, the general elevation extraction process <10> begins by resolution reduction implemented by aggregation <12> which is a process of making a series of progressively reduced resolution images so that, including the initial image pair, the same scene is represented in, say, five levels varying in the amount of detail. A bandpass filter is applied to each of the images for edge enhancement <14> so that features may be located in the images by looking for the edges. While the above steps are conveniently implemented by computer operation they also can be done optically, especially when the original images are optical. When the original images are digitized, the images can be reduced to optical images. Then the aggregation steps (or other resolution reduction) and the filtering are performed optically. The set of filtered images would then be digitized for further operations, described below, performed by computer.

The first images to be further processed are the lowest resolution images <16>. In addition to the left and right filtered images, a third image is required which represents the disparity between the images which is due to terrain elevation. Although the terrain details are yet to be discovered, a knowledge of the region is necessary to estimate the average elevation. This average elevation is used as an initial disparity image <18>. If the elevation extraction is to be performed automatically, that average elevation value is provided to the computer by an operator prior to the beginning of automatic operation. Then a program for feature matching compares the two images to locate common features and whenever a feature match is found, its horizontal offset in the image due to elevation is recorded as the real disparity at that point, thereby generating a new disparity image which is more accurate than any previous disparity image <20>. If the program has not operated on the highest resolution image pair <22>, it increments to the next higher resolution image pair <24> to repeat the feature matching and disparity image generation, this time using the most recent (the most accurate) version of the disparity image. When the highest resolution images have been processed <22> and the disparity image has reached its highest degree of detail and accuracy, the final disparity image is stored without dilation. The elevation information is extracted from the final disparity image <26> to complete the process. Since elevation effects cause feature disparity along image rows, which are generally aligned with the direction of camera sight, the feature search occurs row by row to build the disparity image used for elevation extraction. Further information on feature location useful for steering the matching search to the right row is obtained by scanning also along the columns and building a separate disparity file which has relatively little elevation information.

As shown in FIG. 2, the feature matching and disparity image generating step 20 includes identifying in the edge enhanced left image robust zero-crossings which correspond to the edge of features <30>. Using information in the disparity image the location of each corresponding zero-crossing in the right image is predicted <32> and becomes the center of a search for a matching feature in the right image <34>. For the matched features the real disparities are determined and recorded to generate a new or updated disparity image <36>. The area around each identified disparity is filled in with the same value <38> so that the whole disparity image will resemble the relief of the terrain, albeit the resemblance is very general for the case of low resolution images. The previous disparity image is then replaced by the new one <40>. Next a diagnosis is performed to determine the ratio of matched features to un-matched features <42> which is a measure of the degree of success in developing a suitable disparity table, it being premised that a good disparity table provides steering to good search locations and consequently a high success rate of feature matching. Whenever the match ratio is not satisfactory <44> another feature matching iteration takes place using the new disparity image to further improve the disparity image and the match ratio. When the match ratio is sufficient <44> the feature matching is complete for at least the current level of resolution and the program exits to step 22 of FIG. 1. A more detailed description of the key process steps follows.

Aggregation. A set of reduced resolution images is created by operation of an aggregation program on the image data. The aggregation is performed by averaging the value of 2×2 sets of pixels and using the average value for one pixel in a new image. As indicated in FIG. 3, which shows a few cells of an image 50, a first aggregated image 52 is reduced in resolution by a factor of two so that the number of pixels is reduced by a factor of four, a second aggregated image 54 is reduced by another factor of two for an overall reduction of pixels by sixteen, and so on for additional levels of reduction. For example, a typical 7.5 minute quadrangle will require approximately 2000×2000 pixels at full resolution. The first aggregation will reduce this to 1000×1000 pixels, and the next reduction to 500×500 pixels. Aggregation of each image is performed four times to thereby yield five levels of resolution. If the initial image has 10 meter cells, the lowest resolution image will have 160 meter cells.

The result of the aggregation is that any fine detail in the high resolution image is lost in the lower resolution images and only a relatively few coarse features are visible in the lowest resolution image. This lack of detail allows concentration of effort on the large features initially to obtain general relief information on the overall area.

Bandpass Filtering. Each image from the highest to the lowest resolution is edge enhanced by bandpass filtering in the frequency domain. Various types of filters may be useful. A Laplacian filter in particular has been successfully used. For example, the central portion only of a 15×15 Laplacian filter having a gain of 2 and a 5 pixel diameter array of positive coefficients is shown below:

| −0.218 | −0.271 | −0.236 | −0.199 | −0.236 | −0.271 | −0.218 |
|---|---|---|---|---|---|---|
| −0.271 | −0.143 | 0.200 | 0.402 | 0.200 | −0.143 | −0.271 |

| | | | -continued | | | |
|---|---|---|---|---|---|---|
| −0.236 | 0.200 | 1.006 | 1.443 | 1.006 | 0.200 | −0.236 |
| −0.199 | 0.402 | 1.443 | 2.000 | 1.443 | 0.402 | −0.199 |
| −0.236 | 0.200 | 1.006 | 1.443 | 1.006 | 0.200 | −0.236 |
| −0.271 | −0.143 | 0.200 | 0.402 | 0.200 | −0.143 | −0.271 |
| −0.218 | −0.271 | −0.236 | −0.199 | −0.236 | −0.271 | −0.218 |

The sum of the coefficients of the whole 15×15 array is zero.

The same Laplacian filter is applied to each level of aggregation. Since the cell size is quite large at low levels of resolution, the edges enhanced by the filter correspond to large features on the ground. With each subsequent increase in resolution, smaller and smaller scale edges are emphasized.

Feature Matching. At each level of resolution there are three image files required for feature matching; 1) a left-hand edge-enhanced image, 2) a right-hand edge-enhanced image, and 3) a "disparity image". The disparity image is used to record a value for the apparent shift of a feature between the two images, and thus is a function of look-angle and terrain relief. The disparity is measured in units of right-hand pixels at the highest resolution. This value is then written into the disparity image file. The initial disparity image used with the lowest resolution image pair is loaded with a disparity estimate based on the look-angle geometry of the image pair and the average terrain elevation. The initial disparity estimate thus is a flat terrain surface. Subsequently, when features matches are found, the measured disparities are used to build a new disparity image.

Robust Zero-Crossings. Whenever a scan of a row or column of pixels reveals a polarity change (from positive to negative or vice versa), a zero-crossing has occurred. In remotely sensed images zero-crossings will occur at or very near feature edges. Both images of a pair are scanned line by line and when a zero crossing is discovered in the left image the corresponding area in the right image is searched for the same feature. The feature-matching algorithm uses robust zero-crossings to identify correct matches. A robust zero-crossing (also called a feature) must be at least three pixels long, having zero-crossings of the same polarity occurring in vertically or diagonally adjacent pixels. Thus for a search scanning rows of an image, a robust zero-crossing must have a similar zero-crossing on the scan lines above and below, and be no more than one pixel away in the column dimension. A feature match occurs when a robust zero-crossing in the left image has a like polarity zero-crossing in the right image within a prescribed range of its expected position. This algorithm reduces the amount of incorrect matches and matches due to noise. These robust zero-crossings, then, are the features that are matched at successively higher levels of aggregation.

Steering and Unexpected Disparity. The mapping polynomials can be used to predict the location of a feature in the right image corresponding to a feature found in the left image, except for the disparity due to elevation. The disparity image, then, is used to refine the predicted location by applying an offset to the polynomials and providing a better estimate of the point's position on the earth's surface. Thus the feature matching algorithm uses the polynomials in conjunction with the disparity image to "steer" the search to the expected position on the right image.

FIG. 4 shows a diagram of disparity geometry wherein a feature point F on the terrain is projected in the left image L as a point P on the reference datum. The feature-matching algorithm uses the mapping polynomials from each scene to look at the same point P on the reference datum. The distance between the point P and the point F is the disparity D. If the initial disparity estimate (called the steering disparity) is correct the point will be found at Q. The search in the right image is therefore steered to point Q and is allowed to extend over a search range S of 2.5 pixels. A small search range S is mandated to minimize the likelihood of an incorrect match. The initial steer is critical because of the limited search range. If the initial steer provided by the disparity image misses the point F by more than 2.5 pixels no matches will be found or improper matches will be made. If a robust zero-crossing F found within the 2.5 pixel search range is matched, the sum of the steering disparity D and the unexpected disparity (the distance of the feature F from the point Q) is written into an ASCII file containing the disparity value and its image coordinates.

Diagnosis. In addition to the ASCII disparity file, the feature-matching program produces a diagnostic output indicating the number of positive and negative zero-crossing matches, and the number of left image zero-crossings not matched in the right image. Experiments have shown that if there is no correlation between the two images, i.e., looking for robust zero-crossings using a different area from each image, the ratio of matches (positive plus negative) to misses will be approximately ½. Generally speaking, the match ratio between two highly correlated images will at times exceed 2. These ratios have been empirically derived, and will vary according to the amount of relief in the area being mapped, the level of resolution, and other factors related to steering disparity errors.

Dilation. After an initial run of the feature-matching program the ASCII file contains the locations and values for all of the robust zero crossing matches. Since there are gaps between areas of known disparity caused by not finding any robust zero-crossing matches, the disparity values are dilated to cover these areas. Dilation is done by extending known disparity values over un-matched areas. The initial disparity image is then replaced with the zero crossing disparity values.

Iteration. After the initial disparity estimate has been updated once, further refinement is obtained by repeating the feature search using the newer disparity data. This iterative process may continue until the diagnosis indicates that a suitable ratio of matches have been made. In this manner, terrain features are gradually "chiseled" out of the initial flat plane. Generally speaking, each iteration will produce a higher match-to-unmatched ratio. When the ratio approaches two, the results of the disparity file are simply transcribed up to the next higher resolution images, and the iteration is repeated until the highest resolution images have been similarly processed. At each level, more detail is added to the disparity file and finally the disparity data incorporates all the elevation information.

Elevation Extraction. The final steps in automatic elevation extraction involve converting the high resolution disparity image to elevation data, and georeferencing the results. It should be noted that all processing up to this point has been done in raw data space (SPOT scene row and column coordinates), using the mapping polynomials and disparity image to navigate within each scene.

FIG. 5 shows the relationship between the two satellite view points (heights ZL and ZR), the nadir points of each satellite (XL and XR), a matched feature on the Earth's surface (Z), its projected location as it is imaged by each satellite (X1 and X2), and its orthographically projected location (X) on the reference datum. This figure illustrates the relationship across the satellite track. To calculate the height of point Z the following procedure is used.

First, the coordinates of the point on the reference datum must be located. Although only the equation for the easting coordinate is shown here, the same formula (with Y arguments) is used to calculate the northing coordinate as well.

$$X=[ZL \cdot X1(XR-X2)+ZR8X2(X1-XL)]/[(X1-X-L)ZR+ZL(XR-X2)]$$

Finally, the elevation for point X,Y is calculated using the following formula: $Z=ZL(X1-X)/(X1-XL)$.

The elevation extraction program produces an ASCII file similar to the disparity program, however the position of each known elevation is given in projection coordinates (a rectangular Cartesian coordinate system superimposed on a map projection) rather than raw scene coordinates. Another difference is that elevation data will require an image file that has two bytes per pixel, since elevation values will frequently exceed the one byte limit of 255 meters (if one-meter vertical quantification is desired). Finally, the areas of known elevation are dilated to span the areas where no feature matches were found, The digital elevation file is then ready for ingestion into a geographic information system or for use in orthorectification of either of the two satellite images.

It will thus be seen that the disclosed method of extracting elevation information from a pair of digitized satellite images or the like can be performed with a relatively small amount of computer time and a minimum of operator input. The method is useful whether geometrically corrected images are used or not.

The embodiments of the invention in which an exclusive property or privilege is claimed are defined as follows:

I claim:

1. The method of extracting elevation information form a pair of stereo images of terrain comprising:
   reducing the resolution of each image of a pair of stereo images;
   repeating the resolution reduction step to obtain several successively lower levels of image resolution;
   enhancing edges in each level of image resolution by band-pass filtering the images;
   matching features of the filtered image pair at the lowest level of image resolution by
      estimating an average elevation as a disparity image,
      steering a search for a feature in one image of a pair to match a feature found in the other image by using the disparity image to define the expected relative feature positions, and
      searching for a matching feature in the said one image over a limited area around an expected position,
   wherein the features have expected relative positions in the two images and elevation of a feature causes a disparity in expected positions;
   determining the disparity for each matched feature and generating a disparity image from the disparity of matched features;
   then matching features at successively higher levels of resolution using the disparity image generated at the next lower level of resolution to steer the search for a matched feature, and generating a new disparity image for each resolution level; and
   extracting elevation information from the disparity image for the highest level of resolution.

2. The invention as defined in claim 1 wherein each step of reducing the resolution comprises aggregating the image by a factor of two.

3. The invention as defined in claim 1 wherein the band-pass filtering comprises applying a Laplacian filter to the images.

4. The invention as defined in claim 1 wherein the step of matching features comprises the step of:
   iterating the search for matching features at the same resolution level using the most recently generated disparity image to steer the search, whereby the incidence of matched features increases with each iteration.

5. The method of extracting elevation information from a pair of stereo images of terrain comprising:
   reducing the resolution of each image of a pair of stereo images;
   repeating the resolution reduction step to obtain several successively lower levels of image resolution;
   enhancing edges in each level of image resolution by band-pass filtering the images;
   matching features of the filtered image pair at the lowest level of image resolution wherein the features have expected relative positions in the two images and elevation of a feature causes a disparity in expected positions;
   determining the disparity for each matched feature and generating a disparity image from the disparity of matched features;
   then matching features at successively higher levels of resolution using the disparity image generated at the next lower level of resolution to steer the search for a matched feature, and generating a new disparity image for each resolution level by filling image areas lacking a matched feature with the measured disparities of adjacent matched features to thereby approximate the disparity over the whole image; and
   extracting elevation information from the disparity image for the highest level of resolution.

6. The invention as defined in claim 5 wherein the step of matching features at successively higher levels of resolution comprises the step of:
   iterating the search for matching features at the same resolution level using the most recently generated disparity image to steer the search, whereby the incidence of matched features increases with each iteration.

7. The invention as defined in claim 1 wherein the stereo images are formed by cameras at known heights and nadir points, and wherein the step of extracting elevation information from the disparity image at the highest level of resolution comprises the steps of:
   establishing a reference datum;
   determining the projected locations of a feature point on the reference datum as it is imaged at each camera location;
   determining the projection coordinates of a feature point on the reference datum; and
   calculating the elevation for the feature point on the basis of known camera heights and nadir points, the projection coordinates and the projected locations.

* * * * *